(12) United States Patent
Przybylski et al.

(10) Patent No.: US 8,700,237 B1
(45) Date of Patent: Apr. 15, 2014

(54) SYSTEM AND METHOD FOR COMMUNICATING CRITICAL AND NONCRITICAL DATA IN A CONSIST

(71) Applicant: Electro-Motive Diesel, Inc., LaGrange, IL (US)

(72) Inventors: Lawrence Stanley Przybylski, Lemont, IL (US); Tom Otsubo, Oak Grove, MO (US)

(73) Assignee: Electro-Motive Diesel, LaGrange, IL (US)

( * ) Notice: Subject to any disclaimer, the term of this patent is extended or adjusted under 35 U.S.C. 154(b) by 0 days.

(21) Appl. No.: 13/711,196

(22) Filed: Dec. 11, 2012

(51) Int. Cl.
*G05D 1/00* (2006.01)
*G05D 3/00* (2006.01)
*B61B 13/08* (2006.01)
*H04B 7/15* (2006.01)

(52) U.S. Cl.
USPC ............ 701/19; 701/20; 246/186; 246/187 R; 455/11.1

(58) Field of Classification Search
USPC ....... 701/1, 19, 20; 246/186, 187 R; 455/11.1
See application file for complete search history.

(56) References Cited

U.S. PATENT DOCUMENTS

| | | | |
|---|---|---|---|
| 3,696,758 A | 10/1972 | Godinez, Jr. | |
| 4,042,810 A | 8/1977 | Mosher | |
| 4,181,943 A | 1/1980 | Mercer, Sr. et al. | |
| 4,401,035 A | 8/1983 | Spigarelli et al. | |
| 5,859,874 A * | 1/1999 | Wiedeman et al. | 375/267 |
| 5,969,643 A | 10/1999 | Curtis | |
| 6,862,502 B2 | 3/2005 | Peltz et al. | |
| 6,957,131 B2 * | 10/2005 | Kane et al. | 701/19 |
| 7,021,589 B2 * | 4/2006 | Hess et al. | 246/187 R |
| 7,072,747 B2 | 7/2006 | Armbruster et al. | |
| 7,073,753 B2 | 7/2006 | Root et al. | |
| 7,263,475 B2 | 8/2007 | Hawthorne et al. | |
| 7,502,410 B2 * | 3/2009 | McCorkle et al. | 375/224 |
| 7,548,032 B2 | 6/2009 | Alton, Jr. et al. | |
| 7,949,441 B2 | 5/2011 | Baig et al. | |
| 2005/0121971 A1 | 6/2005 | Ring | |
| 2011/0270475 A1 * | 11/2011 | Brand et al. | 701/20 |
| 2011/0282525 A1 * | 11/2011 | Kraeling et al. | 701/19 |
| 2012/0264370 A1 * | 10/2012 | Smith et al. | 455/11.1 |
| 2013/0089012 A1 * | 4/2013 | Schuster et al. | 370/310 |

* cited by examiner

*Primary Examiner* — Thomas Black
*Assistant Examiner* — Tyler Paige
(74) *Attorney, Agent, or Firm* — Finnegan, Henderson, Farabow, Garrett & Dunner LLP

(57) ABSTRACT

A system is disclosed for communicating a dataset in a consist, the dataset having a critical data portion. The system includes a first transceiver configured to communicate a first data signal indicative of at least the critical data portion of the dataset over a first communication line, and a second transceiver configured to communicate a second data signal indicative of at least the critical data portion of the dataset over a second communication line. The system includes a processor configured to receive the first data signal and the second data signal, to compare the first data signal with the second data signal to determine whether the first data signal or the second data signal includes a more accurate signal, and to determine at least the critical data portion of the dataset based upon the more accurate signal. The critical data portion is associated with the operability of the consist.

20 Claims, 3 Drawing Sheets

US 8,700,237 B1

SYSTEM AND METHOD FOR COMMUNICATING CRITICAL AND NONCRITICAL DATA IN A CONSIST

TECHNICAL FIELD

This disclosure relates generally to a data communication network and, more specifically, to a system and method for communicating critical and noncritical data in a consist.

BACKGROUND

Transmitting data in a consist may allow control systems to monitor and coordinate systems of a locomotive and/or consist, such as brakes, speed, and power. Traditionally, data may be transmitted by various cabling techniques between the railcars making up the consist. Because there is a gap between railcars, the cabling may be exposed to the weather and may be subjected to the turning, twisting, and pulling of the railcars. As a result of such conditions, communication cables may be prone to failures that prevent the transmission of data. Data transmission failure may cause numerous problems or delay the operation of the consist.

One system for communicating data in a consist is described in U.S. Patent Application Publication No. 2011/0282525 A1 ("the '525 publication"). The '525 publication is directed to a communication system for a vehicle consist including a control module that interfaces with at least one of a first router transceiver pair or a redundant router transceiver pair. Each of the router transceiver pairs of the '525 publication may communicate network data between vehicles of the consist over a cable bus of the vehicle consist. The control module may include a monitor module to monitor operation of at least one of the first router transceiver pair or the redundant router transceiver pair. The control module may also include a switch module operably coupled to the monitor module to control the first router transceiver pair or the redundant router transceiver pair to communicate the network data over the cable bus if the other of the first transceiver pair or the redundant router transceiver pair enters a failure condition for being unable to communicate the network data over the cable bus.

The system provided by the '525 publication may suffer from a number of possible drawbacks. For example, the system of the '525 publication may redundantly transmit data, but it does not repair erroneous, corrupted, or incomplete data. Furthermore, redundant transmissions such as those disclosed in the '525 publication may require high bandwidth capacity. Often, large transmissions such as video data may exceed the bandwidth capacity, which may prevent transmission of data critical to the operation of the consist.

The presently disclosed systems and methods are directed to overcoming and/or mitigating one or more of the drawbacks set forth above and/or other problems in the art.

SUMMARY

According to one aspect, this disclosure is directed to a system for communicating a dataset in a consist, the dataset having a critical data portion. The system may include at least a first and a second communication line. The system may also include a first transceiver configured to communicate a first data signal indicative of at least the critical data portion of the dataset over the first communication line and a second transceiver configured to communicate a second data signal indicative of at least the critical data portion of the dataset over the second communication line. The system may also include a processor configured to receive the first data signal and the second data signal. The processor may further be configured to compare the first data signal with the second data signal to determine whether the first data signal or the second data signal includes a more accurate signal and determine at least the critical data portion of the dataset based upon the more accurate signal, wherein the critical data portion is associated with the operability of the consist.

In accordance with another aspect, this disclosure is directed to a computer-implemented method of communicating a dataset in a consist, the dataset having a critical data portion. The method may include receiving via a processor a first data signal and a second data signal, wherein the first data signal and the second data signal are indicative of at least the critical data portion of the dataset. The method may also include comparing via the processor the first data signal with the second data signal to determine whether the first data signal or the second data signal includes a more accurate signal. The method may also include determining via the processor at least the critical data portion of the dataset based upon the more accurate signal. The method may further include detecting via the processor a heartbeat signal indicative of whether a first transceiver associated with the first data signal is functioning properly and, when the first transceiver is not functioning properly, directing via the processor transmission to the first transceiver to cease. The critical data portion is associated with the operability of the consist.

According to another aspect, this disclosure is directed to a consist. The consist may include a plurality of railcars. The consist may also include at least one brake sensor associated with at least one of the plurality of railcars and configured to provide signals indicative of brake pressure associated with the consist and at least one speed sensor associated with at least one of the plurality of railcars and configured to provide signals indicative of speed associated with the consist. The consist may also include a system for communicating a dataset in the consist, the dataset having a critical data portion. The system may include at least a first and a second communication line. The system may also include a first transceiver configured to communicate a first data signal indicative of at least the critical data portion of the dataset over the first communication line and a second transceiver configured to communicate a second data signal indicative of at least the critical data portion of the dataset over the second communication line. The system may also include a processor configured to receive the first data signal and the second data signal. The processor may further be configured to compare the first data signal with the second data signal to determine whether the first data signal or the second data signal includes a more accurate signal and determine at least the critical data portion of the dataset based upon the more accurate signal, wherein the critical data portion is associated with the operability of the consist.

DETAILED DESCRIPTION

Figure 1:
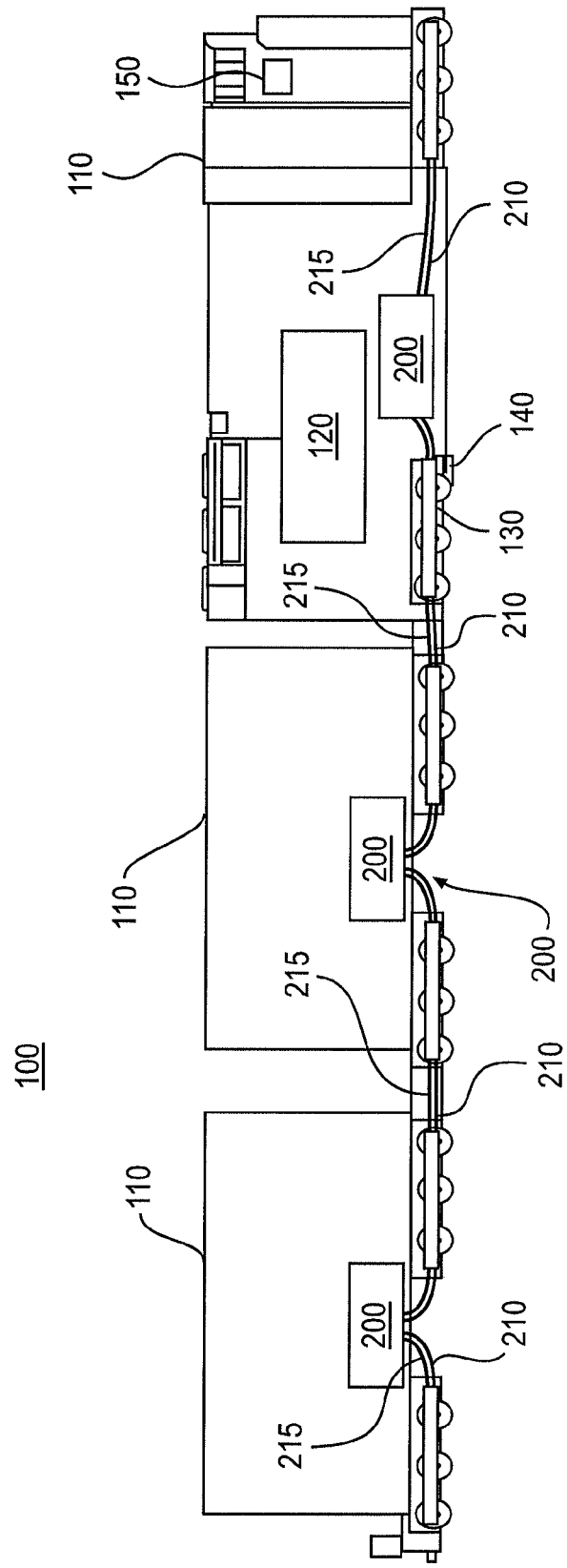
FIG. 1 is a side view of an exemplary embodiment of a consist.

FIG. 1 shows an exemplary consist 100 in which systems and methods for communicating data may be implemented consistent with the disclosed exemplary embodiments. Consist 100 may include one or more railcars 110. Optionally, one or more of railcars 110 may include an engine 120. According to the exemplary embodiment illustrated in FIG. 1, consist 100 may additionally include brakes 130, a brake sensor 140 configured to measure brake pressure, and a speed sensor 150 configured to measure the speed of consist 100. Consist 100 may include a system 200 for communicating data within consist 100. System 200 may include a first communication line 210 and a second communication line 215.

Figure 2:
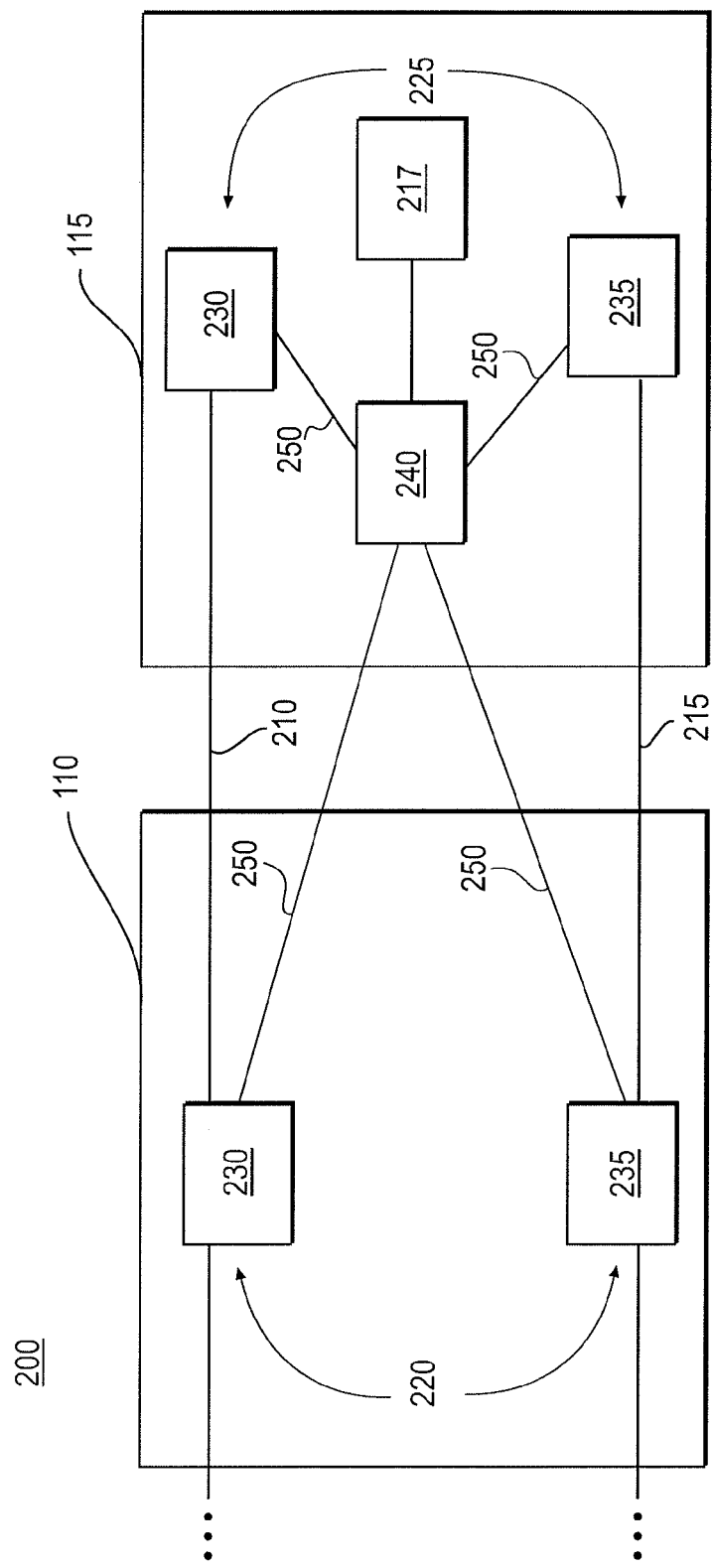
FIG. 2 is a schematic diagram of an exemplary embodiment of a system for communicating data in a consist.

FIG. 2 shows an exemplary embodiment of system 200 for communicating a dataset having a critical data portion within consist 100. First communication line 210 and second communication line 215 may be used to transmit signals indicative of at least the critical data portion between two or more railcars 110. According to some embodiments, communication lines 210 and 215 may be implemented with one or more of digital subscribing line (DSL), Ethernet, or other equivalent cabling technology. According to some embodiments, first communication line 210 may use a different type of cabling technology than second communication line 215. According to some embodiments, communication lines 210 and 215 may be used to link one or more subsystems located on different railcars 110. Communication lines 210 and/or 215 may include insulation and/or coating materials wrapped around conductive portions of communication lines 210 and/or 215. According to some embodiments, communication lines 210 and 215 may be used to link subsystems from railcars 110 directly to a locomotive control system 217. Thus, according to some embodiments, only system 200 located on one or more of lead railcars 110 of consist 100 may include locomotive control system 217.

System 200 may further include a first transceiver set 220 and a second transceiver set 225, and each transceiver set 220 and 225 may be associated with one or more railcars 110. For example, first transceiver set 220 may be located on railcar 110, and second transceiver set 225 may be located on railcar 115, as shown in FIG. 2. Each transceiver set 220 and 225 may include at least a first transceiver 230 and a second transceiver 235. First transceivers 230 may be configured to transmit and/or receive signals along first communication line 210. Second transceivers 235 may be configured to transmit and/or receive signals along second communication line 215.

The dataset transmitted over communication lines 210 and 215 may include both critical data and noncritical data. Critical data may include any data that may be associated with the basic operation of consist 100, such as brake pressure or speed. Critical data may be identified by the operator, or it may be predefined. Additionally or alternatively, critical data may include information relating to heat sensors, such as those in the engines of the locomotive, smoke alarms, and/or information indicative of whether railcars 110 are properly connected in consist 100 Noncritical data is any other data, such as video recordings, that may not be related to the basic operation of consist 100.

Each transceiver 230 and 235 of first transceiver set 220 may be configured to send and/or receive signals indicative of at least the critical data portion of the dataset. According to some embodiments, first transceivers 230 may be configured to send and/or receive signals indicative of the dataset, while second transceivers 235 may be configured to send and/or receive signals indicative only of the critical data portion of the dataset. According to some embodiments, at least one of the first data signal and the second data signal are further indicative of the noncritical data portion of the dataset. According to some embodiments, during operation, both the first data signal sent along communication line 210 and the second data signal sent along communication line 215 may be indicative of the same critical data portion, but it is not required that both data signals be indicative of the entire noncritical data portion. However, upon comparison of the first data signal and the second data signal, errors or missing data for at least the critical data portion may be detected and corrected, even if the first and second data signals transmit different portions of the noncritical data.

According to some embodiments, system 200 may include one or more processors 240 (e.g., a microprocessor) for detecting errors in the first and/or second data signals and for repairing the detected errors. For example, according to the embodiment shown in FIG. 2, system 200 may include processor 240 associated with locomotive control system 217. Processor 240 may embody a single processor or multiple processors that includes a means for detecting errors in the data, repairing the detected errors, and communicating with one or more of transceivers 230 and 235. Additionally or alternatively, processor 240 may be a portion or all of locomotive control system 217. Numerous commercially available processors can be configured to perform the functions of processor 240. It should be appreciated that processor 240 could readily embody a general machine or customized processor capable of controlling the operation of system 200. Processor 240 may include all components required to run an application, such as, for example, a memory, a secondary storage device, and a processor, such as a central processing unit or other known means. Various other known circuits may be associated with processor 240, including power source circuitry (not shown) and other appropriate circuitry.

Processor 240 may be able to identify the critical data portion of the dataset contained in the first and second data signals. To detect any errors in the parts of the first and second data signals indicative of the critical data portion, processor 240 may compare at least the critical data portion of the first data signal sent by first transceiver 230 with the critical data portion of the second data signal sent by the second transceiver 235. Additionally or alternatively, processor 240 may determine which data signal locomotive control system 217 should rely upon to determine the dataset underlying both data signals. For example, processor 240 may determine that the first data signal is a more accurate representation of the critical portion of the dataset based on a comparison of the characteristics of both data signals. According to some embodiments, processor 240 may determine which of the two data signals has a greater signal strength. For example, processor 240 may detect a first signal strength associated with the first data signal and a second signal strength associated with the second data signal. Then, processor 240 may compare first signal strength with second signal strength and determine the more accurate signal. Processor 240 may then disregard the weaker data signal and indicate to locomotive control system 217 that the stronger data signal is indicative of at least the critical data portion of the dataset.

According to some embodiments, after processor 240 compares the signals sent by first transceiver 230 and second transceiver 235, processor 240 may instruct transceivers 230 and 235 to send the first and second data signals across communications lines 210 and 215, respectively. According to some embodiments, when no errors are detected, this may include a signal directing first transceiver 230 and second transceiver 235 to transmit the first and second data signals that they received, respectively, to second transceiver set 225. Additionally or alternatively, processor 240 may send the dataset to one or more of transceivers 230 and 235 to transmit signals indicative of this dataset across communication lines 210 and/or 215, respectively.

According to some embodiments, each railcar 110 may include one or more processors 240. By associating each processor 240 with one or more transceiver sets 220, each processor 240 may verify data received by transceivers 230 is repaired after each transmission. In some alternative embodiments, processors 240 may be placed anywhere within consist 100 where it may be desired to verify the accuracy of the transmitted data. For example, processor 240 may be associated with and/or contained in locomotive control system 217. Other embodiments do not include transceiver sets 220 in every railcar 110, but rather in any desired subset configuration of railcars 110.

According to some embodiments, such as those in which both the first and the second data signals are indicative of less than the entirety of the dataset, a third data signal may be sent. For example, first transceiver 230 may send a third data signal indicative of the noncritical data portion over first communication line 210. Additionally or alternatively, second transceiver 235 may send a third data signal indicative of the noncritical data portion over second communication line 215. The third data signal may be sent at a lower priority than the first and/or second data signals, such that critical data is sent at a high priority.

According to some embodiments, processor 240 may be further configured to identify errors in the functionality of transceivers 230 and/or 235 before the transmission of data. For example, as shown in FIG. 2, system 200 may include a plurality of heartbeat lines 250. Heartbeat lines 250 may be configured to transmit a heartbeat signal from at least one of the first transceivers 230. Each transceiver 230 and 235 may repeatedly output a pulse or a continuous signal, such as a low voltage pulse or signal, called a "heartbeat signal," that may be transmitted along heartbeat lines 250 to processor 240. Processor 240 may be further configured to monitor the functionality of each transceiver 230 and/or 235 by verifying the existence of a heartbeat signal transmitted by each transceiver.

According to some embodiments, processor 240 may receive a heartbeat signal directly from the particular transceiver that is transmitting the heartbeat signal. Additionally or alternatively, processor 240 may receive a heartbeat signal indirectly by monitoring the heartbeat signal received by a particular transceiver from the corresponding transceiver of another transceiver set. Processor 240 may also be configured to direct data transmissions along communication lines 210 and between transceiver sets 220 and 225 based on the functionality of individual transceivers 230 and/or 235. If processor 240 does not detect a heartbeat signal from one of transceivers 230 and 235, it may prevent data from being transmitted to that transceiver. For example, processor 240 may direct transmission of the first data signal to first transceiver 230 only when it determines first transceiver 230 is functioning properly (e.g., its outputting a heartbeat signal). Likewise, processor 240 may direct transmission of the second data signal to second transceiver 235 only when it determines second transceiver 235 is functioning properly (e.g., its outputting a heartbeat signal). Redundant communication lines 210 and/or 215 may be used to ensure a successful transmission of data between transceiver sets 220 and 225 by sending the signals only to the functioning transceivers 230 and/or 235.

If processor 240 determines that first transceiver 230 is not functioning properly (i.e., processor 240 no longer detects a heartbeat signal associated with first transceiver 230), processor 240 may be configured to direct transmission of the critical and noncritical data portions of the dataset to second transceiver 235. In this exemplary manner, processor 240 may ensure that the entirety of the dataset is transmitted between railcars 110 and 115. This functionality may be particularly useful when first data signal and second data signal transmit different portions of the dataset. Furthermore, this functionality may allow both critical and noncritical data portions to be transmitted on one of communication lines 210 or 215 at different priorities.

To accomplish this, processor 240 may be configured to identify a first quality-of-service metric for the critical data portion and a second quality-of-service metric for the noncritical data portion. Quality-of-service metrics may include one or more of a required bit rate, delay, jitter, packet dropping probability and bit error rate. Processor 240 may direct transmission of both the critical and noncritical data portions over second communication line 215 using a link aggregation control protocol (LAPC), while maintaining at least one of the first and the second quality-of-service metrics.

According to some embodiments, connectivity conditions may make it unfeasible to maintain both the first and second quality-of-service metrics. This may be true, for example, if the high bandwidth requirements of the noncritical data and external factors that increase the signal-to-noise ratio make it impractical to achieve the desired bit rate requirements of the critical data while still transmitting the noncritical data in a timely manner. Thus, processor 240 may be configured to determine connectivity conditions and a minimum requirement for one or more of these connectivity conditions. These connectivity conditions may include at least one of service response time, loss, signal-to-noise ratio, bit rate, delay, jitter, packet dropping probability, and bit error rate. If processor 240 determines that one or more of these connectivity features drops below a minimum requirement, processor 240 may direct transmission of the noncritical portion of the dataset to cease. This may be preferable in circumstances in which the reliability of the signals is low, including extreme weather conditions that may impact the integrity of one or more of communication lines 210 and 215.

Figure 3:
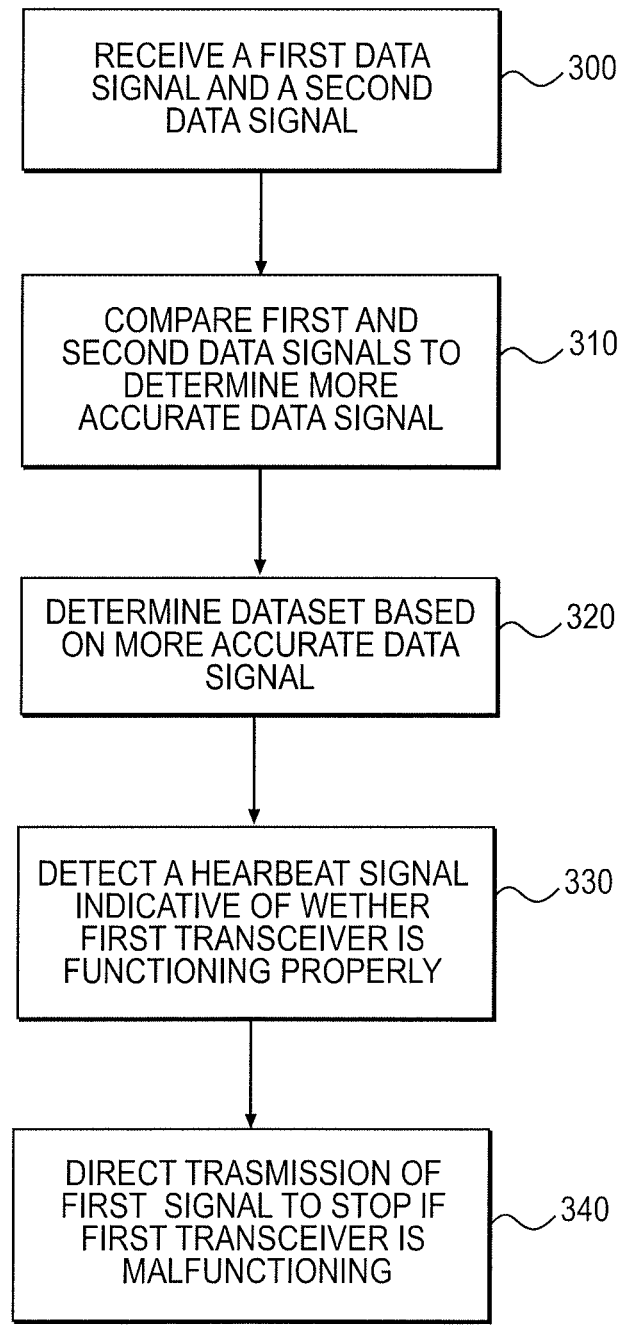
FIG. 3 is a flowchart of an exemplary embodiment of a method for communicating data in a consist.

FIG. 3 is a flow chart representing an exemplary embodiment of a method for communicating data along consist 100. At step 300, processor 240 may receive a first data signal indicative of a dataset to be sent from first transceiver 230 of first transceiver set 220 along first communication line 210 to locomotive control system 217. Also at step 300, processor 240 may receive a second signal indicative of the dataset to be sent from second transceiver 235 of first transceiver set 220 along second communication line 215 to locomotive control system 217.

At step 310, processor 240 may compare the first data signal to the second data signal to determine which signal may be a more accurate representation of the underlying dataset. This comparison may include detecting any inconsistencies or differences between the two signals, as previously discussed further with reference to FIG. 2. For example, if any portion of first data signal differs from the respective portion of second data signal, processor 240 may determine an error is present. Additionally or alternatively, this comparison may include comparing the relative signal strength of the two data signals. For example, processor 240 may determine that the signal with the higher signal strength is a more reliable indication of the dataset of both data signals, and thus processor may determine the signal with the higher signal strength is a more accurate representation of the dataset. At step 320, processor 240 determines the dataset based on the more accurate data signal.

At step 330, processor 240 may detect a heartbeat signal indicative of whether first transceiver is functioning properly. For example, if a heartbeat signal is not detected from first transceiver 230 of first transceiver set 220, processor 240 may determine that first transceiver 230 is not functioning properly. At step 340, when first transceiver 230 is not functioning properly, processor 240 may direct transmission of the first signal to stop, such that only signals sent to and/or from second transceiver 235 of first transceiver set 220 may continue. According to some embodiments, under such circumstances, both critical and noncritical data portions of the dataset may be sent to and/or from second transceiver 235 on a communication line. For example, link aggregation control protocol may be used to send both portions of the dataset across second communication line 215.

INDUSTRIAL APPLICABILITY

The disclosed systems and methods may provide a robust solution for communicating data in a consist. The presently disclosed systems and methods may have several advantages. For example, the reliability of data communicated within a consist may be greatly increased because of the redundancy in transmission on multiple communication lines and/or the separation of critical from noncritical data. Isolating critical data and prioritizing its transmission over that of noncritical data may increase the accuracy and efficiency of the communication of data essential to the control systems used for the operating procedures of the consist.

Additionally, according to some embodiments, the disclosed systems and methods may be customized based on the particular characteristics and requirements of the consist. For example, the configuration of processors, transceivers, and monitoring modules may be selected based on considerations, such as the consist length and functions of the railcars within the consist. Also, the number of communication lines and the type of wiring may be selected based on type of consist and the desirability for accurate data transmission.

It will be apparent to those skilled in the art that various modifications and variations may be made to the disclosed systems for communicating data in a consist and associated methods for operating the same. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for communicating a dataset in a consist, the dataset having a critical data portion, the system comprising:
    at least a first and a second communication line;
    a first transceiver configured to communicate a first data signal indicative of at least the critical data portion of the dataset over the first communication line;
    a second transceiver configured to communicate a second data signal indicative of at least the critical data portion of the dataset over the second communication line; and
    a processor configured to:
        receive the first data signal and the second data signal;
        compare the first data signal with the second data signal to determine whether the first data signal or the second data signal includes a more accurate signal; and
        determine at least the critical data portion of the dataset based upon the more accurate signal,
    wherein the critical data portion is associated with the operability of the consist.

2. The system of claim 1, wherein at least one of the first transceiver and the second transceiver is further configured to communicate a third data signal indicative of a noncritical data portion of the dataset over at least one of the first communication line and the second communication line, wherein the third data signal has a lower priority than the first data signal and the second data signal.

3. The system of claim 1, wherein at least one of the first signal and the second signal is further indicative of the noncritical data portion.

4. The system of claim 1, wherein the processor is further configured to:
    detect a first signal strength of the first data signal and a second signal strength of the second data signal;
    compare the first and second signal strengths to determine which of the first data signal and the second data signal has a greater signal strength; and
    identify the more accurate signal as the first data signal or second data signal having the greater signal strength.

5. The system of claim 1, wherein the critical data portion includes at least one of a signal indicative of speed and a signal indicative of brake pressure associated with the consist.

6. The system of claim 1, further including:
    a plurality of heartbeat lines, each heartbeat line configured to transmit a heartbeat signal from one of the first and second transceivers, wherein the processor is further configured to detect the heartbeat signal from at least one of the first and second transceivers and determine whether the at least one of the first and second transceivers is functioning properly and when the first transceiver is not functioning properly, direct transmission of the critical and noncritical data portions to the second transceiver.

7. The system of claim 6, wherein the processor is further configured to:
    identify a first quality-of-service metric for the critical data portion and a second quality-of-service metric for the noncritical data portion; and
    direct transmission of both the critical data portion and the noncritical data portion over the second communication line using a link aggregation protocol while maintaining at least one of the first quality-of-service metric and the second quality-of-service metric.

8. A computer-implemented method of communicating a dataset in a consist, the dataset having a critical data portion, the method comprising:
    receiving via a processor a first data signal and a second data signal, wherein the first data signal and the second data signal are indicative of at least the critical data portion of the dataset;
    comparing via the processor the first data signal with the second data signal to determine whether the first data signal or the second data signal includes a more accurate signal;
    determining via the processor at least the critical data portion of the dataset based upon the more accurate signal;
    detecting via the processor a heartbeat signal indicative of whether a first transceiver associated with the first data signal is functioning properly; and
    when the first transceiver is not functioning properly, directing via the processor transmission to the first transceiver to cease,
    wherein the critical data portion is associated with the operability of the consist.

9. The method of claim 8, further including receiving a third data signal indicative of a noncritical data portion of the dataset, wherein the third data signal has a lower priority than at least one of the first and second data signals.

10. The method of claim 9, further including:
identifying a first quality-of-service metric for the critical data portion and a second quality-of-service metric for the noncritical data portion; and
directing transmission of both the critical and noncritical data portions using a link aggregation protocol while maintaining at least one of the first quality of service metric and the second quality-of-service metric.

11. The method of claim 10, further including:
determining that a connectivity condition has dropped below a minimum requirement; and
directing transmission of the noncritical data portion to cease.

12. The method of claim 11, wherein the connectivity condition includes at least one of service response time, loss, signal-to-noise ratio, bit rate, delay, jitter, packet dropping probability; and bit error rate.

13. The method of claim 8, wherein the critical data portion includes at least one of a signal indicative of speed and a signal indicative of brake pressure associated with the consist.

14. A consist comprising:
a plurality of railcars;
at least one brake sensor associated with at least one of the plurality of railcars and configured to provide signals indicative of brake pressure associated with the consist;
at least one speed sensor associated with at least one of the plurality of railcars and configured to provide signals indicative of speed associated with the consist; and
a system for communicating a dataset in the consist, the dataset having a critical data portion, the system comprising:
  at least a first and a second communication line;
  a first transceiver configured to communicate a first data signal indicative of at least the critical data portion of the dataset over the first communication line;
  a second transceiver configured to communicate a second data signal indicative of at least the critical data portion of the dataset over the second communication line; and
  a processor configured to:
    receive the first data signal and the second data signal;
    compare the first data signal with the second data signal to determine whether the first data signal or the second data signal includes a more accurate signal; and
    determine at least the critical data portion of the dataset based upon the more accurate signal,
    wherein the critical data portion is associated with the operability of the consist.

15. The consist of claim 14, wherein at least one of the first transceiver and the second transceiver is further configured to communicate a third data signal indicative of a noncritical data portion of the dataset over at least one of the first communication line and the second communication line, wherein the third data signal has a lower priority than the first data signal and the second data signal.

16. The consist of claim 14, wherein at least one of the first signal and the second signal is further indicative of the noncritical data portion.

17. The consist of claim 14, wherein the processor is further configured to:
detect a first signal strength of the first data signal and a second signal strength of the second data signal;
compare the first and second signal strengths to determine which of the first data signal and the second data signal has a greater signal strength; and
identify the more accurate signal as the first data signal or second data signal having the greater signal strength.

18. The consist of claim 14, wherein the critical data includes at least one of a signal indicative of brake pressure and a signal indicative of speed associated with the consist.

19. The consist of claim 14, further including:
a plurality of heartbeat lines, each heartbeat line configured to transmit a heartbeat signal from one of the first and second transceivers, wherein the processor is further configured to detect the heartbeat signal from at least one of the first and second transceivers and determine whether the at least one of the first and second transceivers is functioning properly, and when the first transceiver is not functioning properly, direct transmission of the critical and noncritical data portions to the second transceiver.

20. The consist of claim 19, wherein the processor is further configured to:
identify a first quality-of-service metric for the critical data portion and a second quality-of-service metric for the noncritical data portion; and
direct transmission of both the critical data portion and the noncritical data portion over the second communication line using a link aggregation protocol while maintaining at least one of the first quality-of-service metric and the second quality-of-service metric.

* * * * *